July 13, 1954   B. I. COVEN ET AL   2,683,507
PORTABLE AND COLLAPSIBLE FOOD SCREEN
Filed May 1, 1953   5 Sheets-Sheet 1
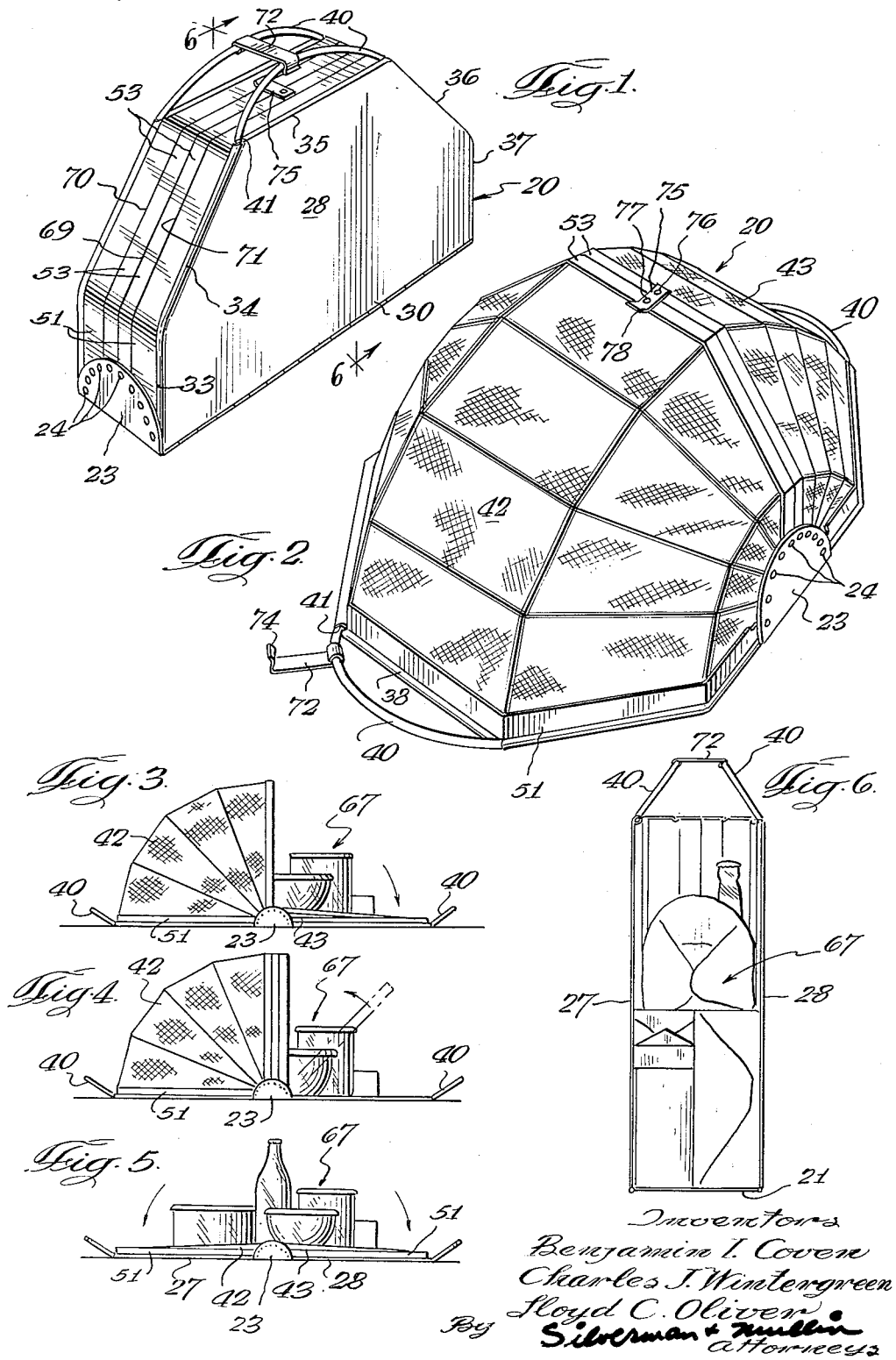

July 13, 1954
B. I. COVEN ET AL
2,683,507
PORTABLE AND COLLAPSIBLE FOOD SCREEN
Filed May 1, 1953
5 Sheets-Sheet 2
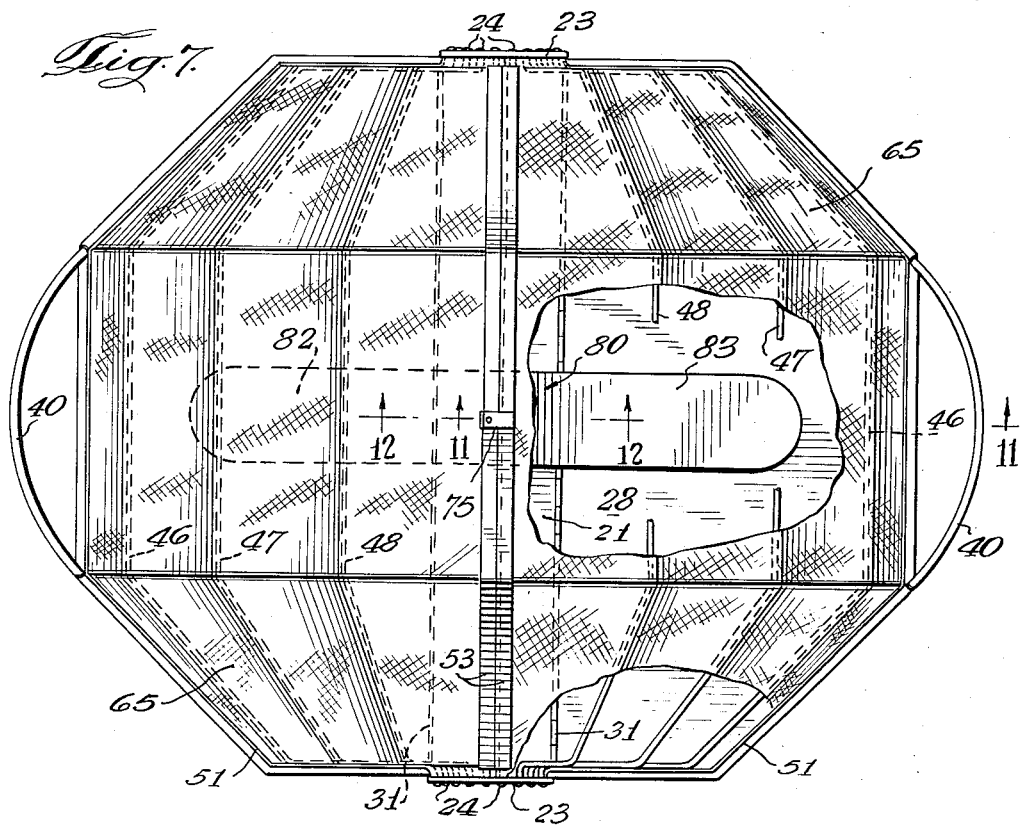
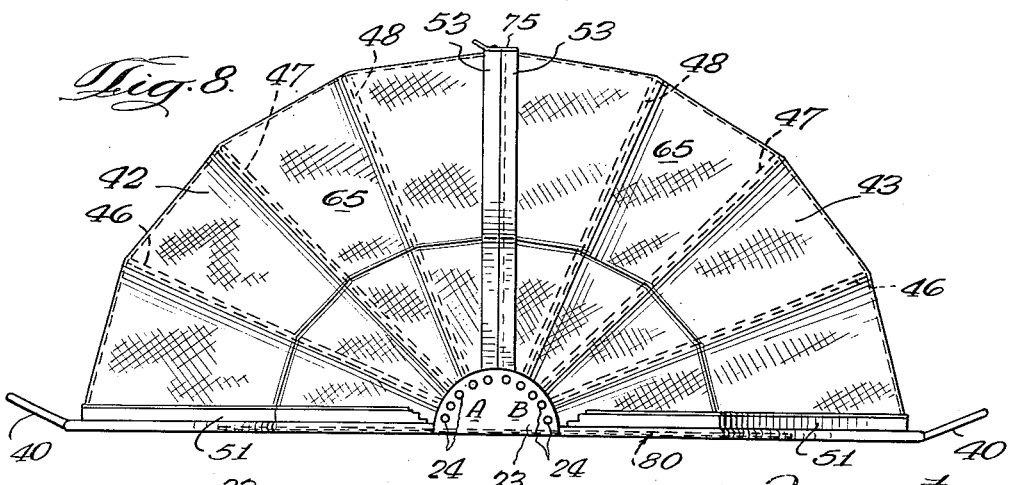
Inventors
Benjamin I. Coven
Charles J. Wintergreen
Lloyd C. Oliver
BY Silverman + Mullin
Attorneys July 13, 1954

B. I. COVEN ET AL 2,683,507

PORTABLE AND COLLAPSIBLE FOOD SCREEN

Filed May 1, 1953

Inventors
Benjamin I. Coven
Charles J. Wintergreen
Lloyd C. Oliver
By Silverman & Mullin
Attorneys July 13, 1954  B. I. COVEN ET AL  2,683,507
PORTABLE AND COLLAPSIBLE FOOD SCREEN
Filed May 1, 1953  5 Sheets-Sheet 4
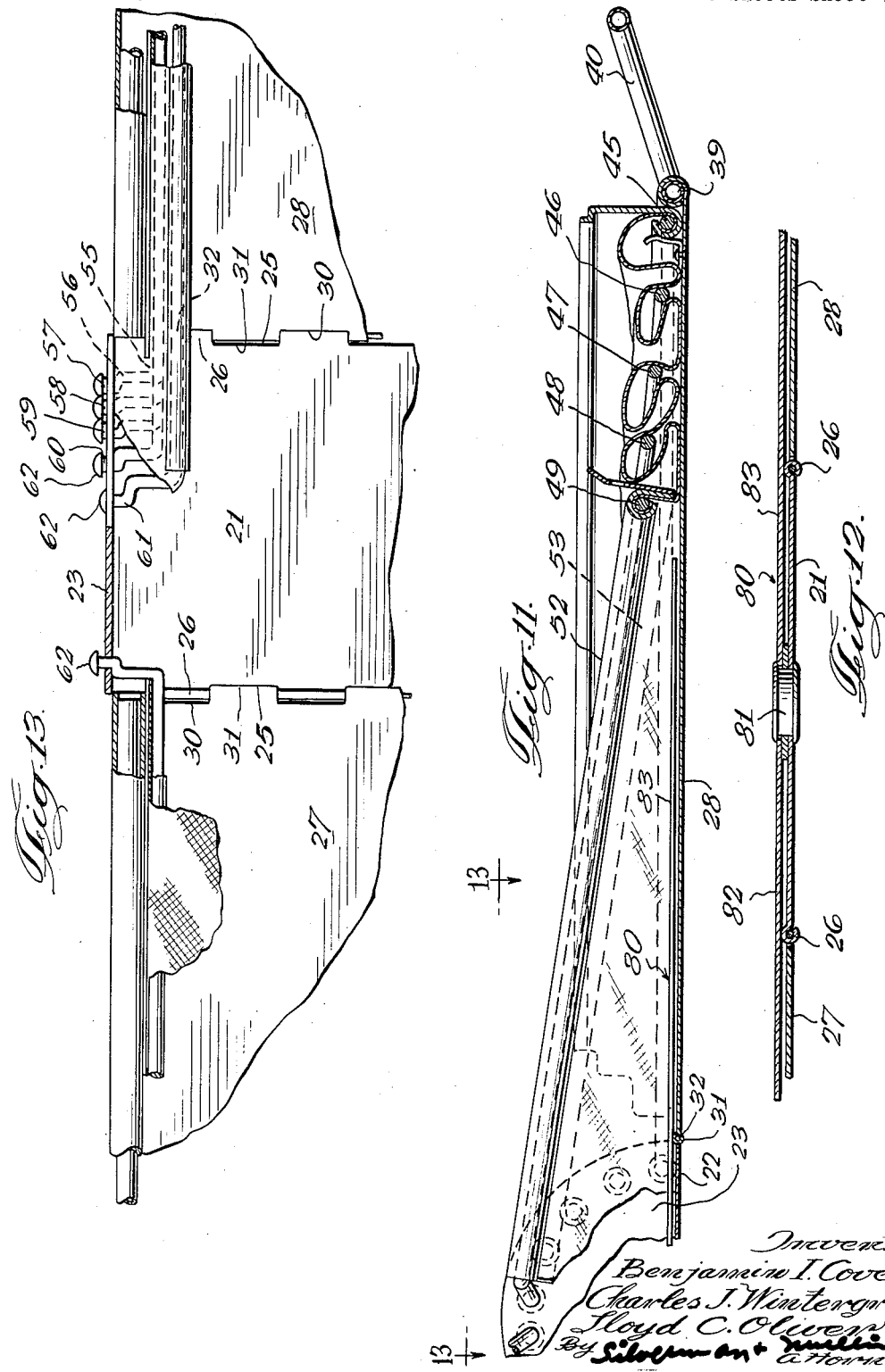

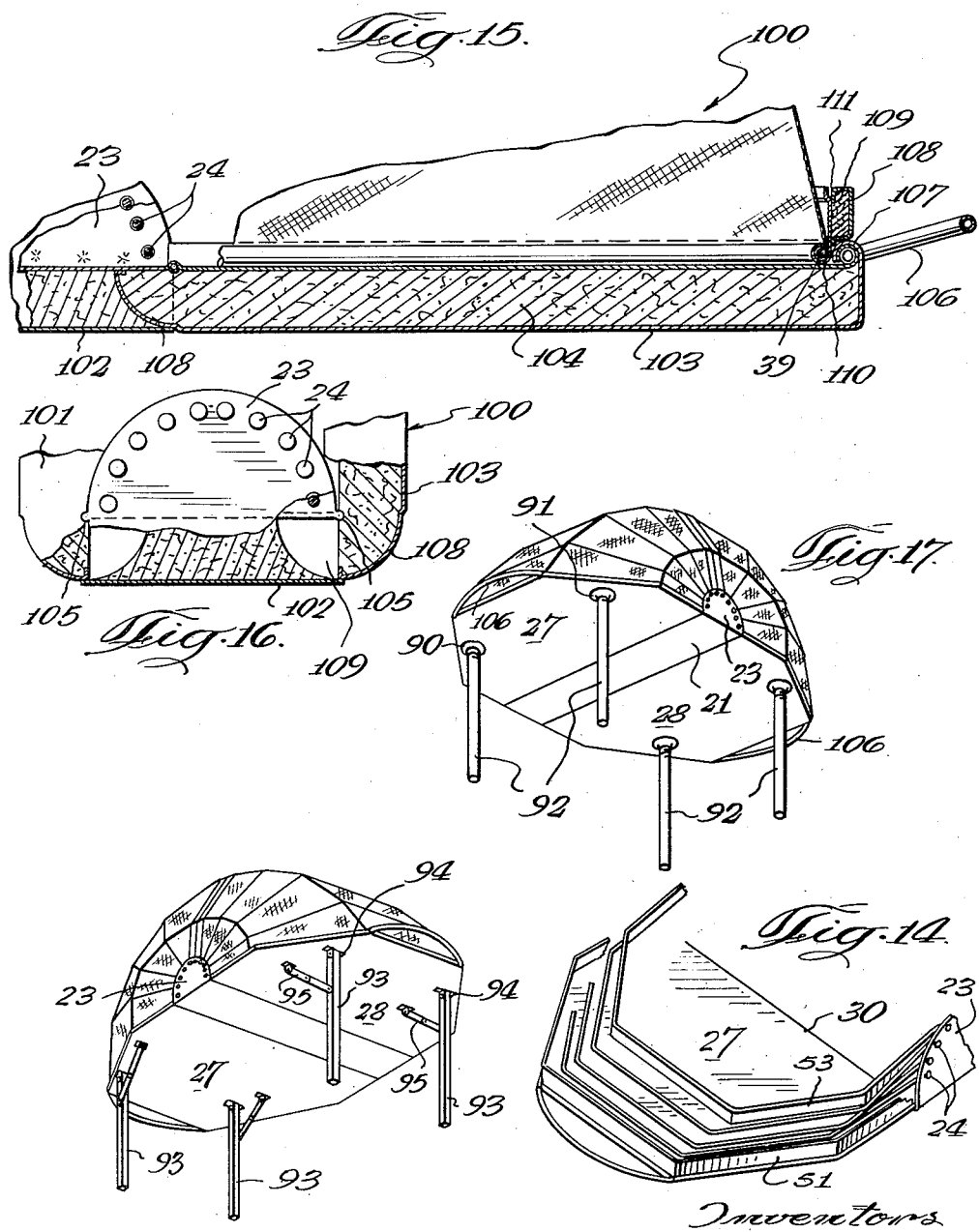

Patented July 13, 1954

2,683,507

UNITED STATES PATENT OFFICE 2,683,507

PORTABLE AND COLLAPSIBLE FOOD SCREEN

Benjamin I. Coven and Charles J. Wintergreen, Chicago, and Lloyd C. Oliver, Villa Park, Ill.; said Wintergreen and said Oliver assignors to said Coven Application May 1, 1953, Serial No. 352,374

10 Claims. (Cl. 190—12)

This invention relates generally to screens and more particularly is concerned with a novel and unique food screen device which is portable and collapsible.

It is a primary object of the invention to provide a food screen device of the character described which is capable of being used either as a compact, portable carrying case having a large chamber for holding articles of food therein or as a relatively large table for supporting said articles of food, there being a foldable screen enclosing the surface of the table after same has been set up to protect the food from dirt, insects and the like. In connection with this latter mentioned use of the device, it is also contemplated that the folding screen of our invention which is provided to cover the surface of the table when the said food screen device is so assembled, may also be constructed in a manner such as to provide a screen capable also of being used independently of our device. In this connection, the said foldable screen would be capable of being rested on any flat surface over articles of food supported thereon.

Another object of the invention is to provide a food screen device of the character described having a base portion comprised of at least two pivotally mounted plate members which may be moved to one position forming the said carrying case and to a second position forming said table surface.

Another object of the invention is to provide a food screen device of the character described having a pair of complemental screen sections which may be moved independently or in unison for providing access to the interior of said device in either of its conditions of assembly above referred to.

Still another object of the invention is to provide a food screen device of the character described in which said screen sections each include a collapsible framework supporting a flexible screen cover thereon. Said screen sections are adapted either to be mounted on the base portion of the device or same may be constructed so as to be supported on any flat surface independently to provide a foldable screen to protect food.

Another object of the invention is to provide a device of the character described having various means for locking the complemental screen sections against inadvertent collapse or movement while the device is in either condition of assembly.

Another object of the invention is to provide a device of the character described which may be supplied with either foldable or removable leg members for supporting the device spaced above ground when in its condition of assembly providing a screen covered table surface.

Another object of the invention is to provide a device of the character described in which the two pivotally mounted base sections of the device have cooperating handle members formed therewith for enabling the device to be carried.

An ancilliary object of the invention is to provide a food screen device constructed in accordance with the principles of our invention which in either of its two conditions of assembly provides a fully insulated enclosure for the food.

Other objects of the invention reside in providing a food screen device embodying the invention which is strong and durable; which is light in weight, easy and simple to carry and assemble in either of its said two conditions of assembly; and which may be manufactured economically and with readily available materials.

These and other objects of the invention will become apparent as the description thereof proceeds and in connection with which preferred embodiments of the invention have been shown in the accompanying drawings and fully described in the specification. It is contemplated that minor changes in the construction, assembly, arrangement and size of parts may occur to the artisan skilled in the field of endeavor to which the invention pertains, however, it is intended that such minor changes may occur without departing from the spirit or circumventing the scope of the invention as set forth in the appended claims.

In the drawings:

Figs. 1 and 2 are perspective views of the food screen device embodying our invention, same being shown in Fig. 1 in one condition of assembly constituting same a portable carrying case and in Fig. 2, in a condition of assembly constituting same a screen covered table surface.

Figs. 3, 4 and 5 are side elevational vews of the said device in its condition of assembly as shown in Fig. 2, each of Figs. 3, 4 and 5 showing a different manner in which the complemental screen sections may be manipulated.

Fig. 6 is a sectional view taken through our device along the line 6—6 of Fig. 1 and in the direction indicated, there being shown the manner in which food may be stored in the device when same is being used as a carrying case.

Fig. 7 is a top plan view of the device as shown in Fig. 2.

Fig. 8 is a side elevational view of the device in the condition of assembly shown in Fig. 2.

Fig. 11 is a sectional view taken through the device along the line 11—11 of Fig. 7 and in the direction indicated, but with the device opened as shown in Fig. 5.

Fig. 12 is a sectional view taken through the device along the line 12—12 of Fig. 7 and in the direction indicated.

Fig. 13 is a sectional view taken through a portion of the device along the line 13—13 of Fig. 11 and in the direction indicated.

Fig. 14 is a perspective view of a portion of the device as shown in Fig. 2 and having the screen covering removed to show the structural framework for supporting the screen covering.

Fig. 15 is a sectional view taken through the base portion of a modified form of our invention and showing how our device may be constituted a fully insulated enclosure for food.

Fig. 16 is a fragmentary end-on elevational view of the modified form of our invention, portions being broken away to show details thereof.

Figs. 17 and 18 are each bottom perspective views of the device showing the two different manners of providing leg members thereon.

Fig. 19 is a perspective view of the base portion of our device with the screen sections removed.

Figures 9, 10:
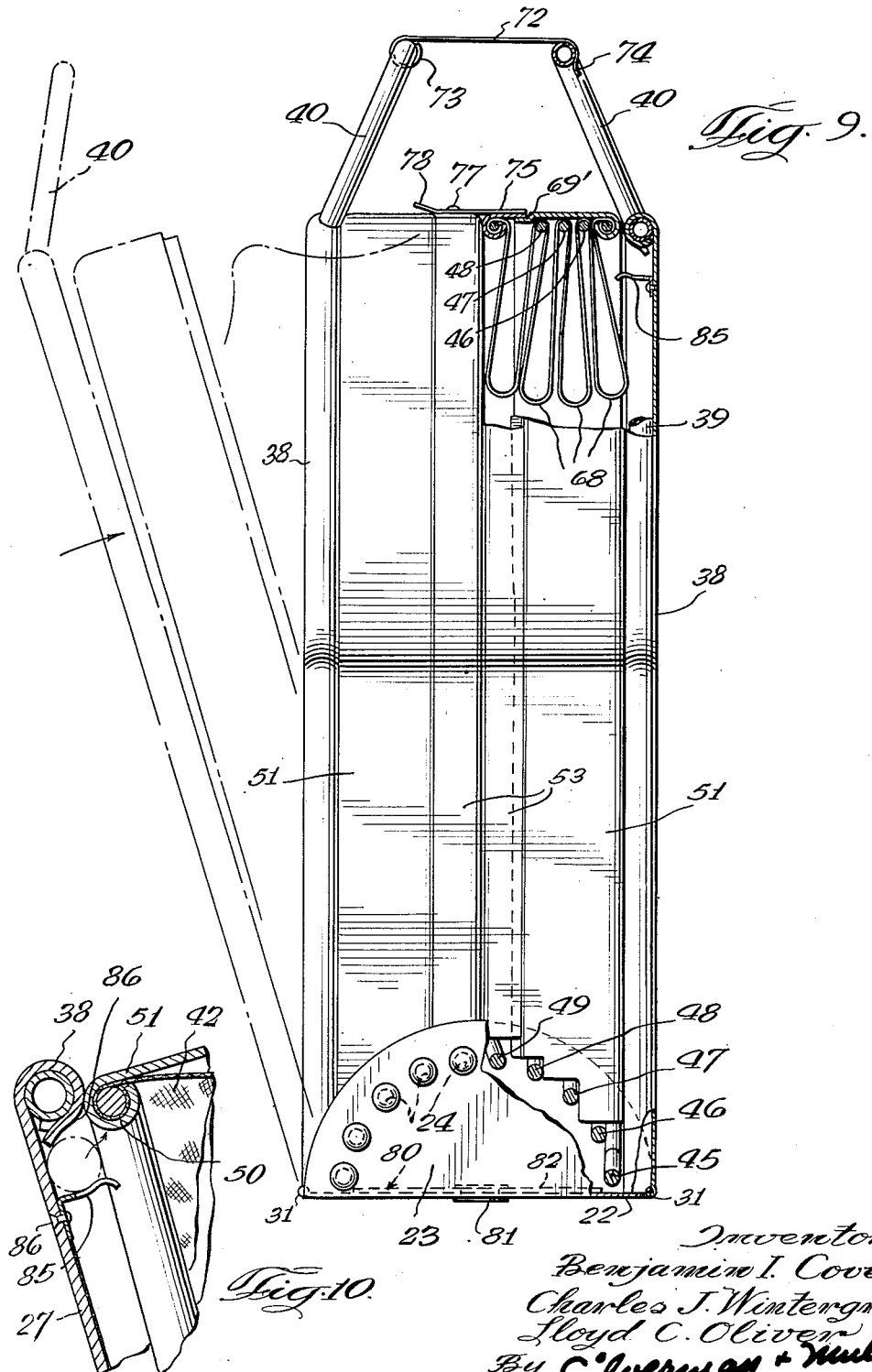
Fig. 9 is an end-on elevational view of the device as shown in Fig. 1, portions being broken away to show certain details thereof.
Fig. 10 is a fragmentary sectional view taken through a portion of the device as shown in Fig. 9.

Generally, the food screen device embodying the invention is provided with a base portion comprised of at least three plate members, of which one plate is fixed and the other two plates are pivotally connected thereto. The two pivotal plate members may be pivoted to one position wherein each lies substantially in the plane of the third or fixed plate member thereby forming a relatively large, flat table surface. Also, said two pivotal plates may be moved to a second position substantially perpendicular to the third or fixed plate whereby the device is constituted a portable carrying case. Pivotally mounted on the said fixed plate member and in association with said pivotal plate members is a pair of complemental, foldable screen sections. When the device is constituted a carrying case, said screen sections are folded between the two pivotal plate members and cooperate with the same to provide a carrying case. In this condition of assembly, the screen sections may be unfolded to completely overlie the three plate members thus enclosing the table surface provided thereby. The screen sections are constructed so that when the three plate members all are arranged in the same plane, either of the screen sections may be folded or unfolded independently of the other or both may be folded or unfolded together on said plate members.

Although the foldable screen sections are said to be mounted on the base portion, it is contemplated that the said screen sections also may be constructed to be used independently on any flat surface. In this connection, the screen sections would be so constructed as to be pivotally connected one to the other without a base portion being provided for mounting the same. Thus, the said screen sections could be rested on any flat surface and be operable.

There are other important features of the invention which will appear more fully as the description proceeds in detail. These are generally as follows: When the screen sections are unfolded on the three plate members constituting the base of our device, various locking mechanisms are provided for preventing inadvertent collapse of either one or both of the said screen sections; when the device is constituted a carrying case, novel handle members are provided for carrying the device; also means for locking said pivotal plate members against inadvertent movement opening the carrying case as same is being carried; the device may be adapted to have leg members for supporting same above ground. Lastly, the device lends itself to be constructed in a manner providing a fully insulated enclosure for articles of food in either of its two conditions of assembly.

Referring now to the drawings, the device embodying the invention has been designated generally by the reference character 20. Same includes a base portion comprising a substantially rectangular plate 21 having an upstanding, arcuate flange 23 on each end thereof. The flanges 23, 23 each may be integrally formed with said plate or suitably attached by any well-known means. Likewise, it is contemplated that the shape of each flange need not be arcuate. Spaced from the peripheral edge of each flange are plurality of readily aligned openings 24. Since the flanges are arranged opposite one the other, the openings 24 of the flanges also are arranged with each opening in one flange having an opening in the second flange aligned therewith. Each of the longer side edges 25, 25 has a plurality of hinge barrel sections 26 spaced apart along the length of each.

The base portion also includes a pair of plate members 27 and 28 which may be of generally polygonal configuration although not necessarily limited thereto. Each member 27 and 28 has at least one side edge 30 whose length is substantially equal to the length of a side edge 25. Formed along side edge 30 of each plate member 27 and 28 are a plurality of spaced apart, hinge barrel sections 31, the sections 26 and 31 adapted to be cooperatively engaged in alternate arrangement one to the other by means of a hinge pin 32 passing therethrough whereby each of said plate members 27 and 28 may be hingedly connected along a side edge 25 of the plate 21.

The plates 21, 27 and 28 may be sheet metal, it being contemplated that such light weight metal as aluminum would be desirable. Also, plastic sheet material would be satisfactory. Also, although the sections 26 and 31 cooperating to form the hinged connection have been described as integrally formed with the respective plate members, it is not intended to be so limited, since separate hinge members also would suffice.

Thus, as shown in Fig. 19, said plates 27 and 28 may be pivoted in a direction away one from the other so as to lie substantially in the same plane as the plane of plate 21 thereby providing a relatively wide table surface for articles of food. Or else, as shown in Fig. 1, said plate members may be pivoted upward and toward each other from their position shown in Fig. 19, so that each is substantially perpendicular to plate 21 whereby the device 20 is formed into a portable carrying case as described.

There are further features of the plates 27 and 28 requiring detailed description, however, since the plates 27 and 28 are of identical construction, it is necessary only to describe the plate 28 in detail, it being understood that such description applies equally to the plate 27.

Along each of the other side edges 33, 34, 35, 36 and 37 of plate member 28 is formed a continuous integral cylindrical roll 38. A wire or rod 39 is extended through the roll 38 along substantially the entire length thereof except for a portion 40 of said wire or rod which protrudes from said rolled edge 38 in the vicinity of the side edge 35 through suitable openings 41. The said portion 40 is spaced from the side edge 35, so that the two portions 40, 40 (there being one for each plate 27 and 28) provide a pair of cooperating handle members for pivoting the plates 27, 28 respectively or for carrying the device 20 when same is assembled to form a carrying case.

The screen covering or canopy portion of our device is comprised of a pair of foldable complemental screen sections designated 42, 43. Each of these sections are of identical construction so that only one of them will be described in full detail, the description of one applying equally to the other of said sections. Generally, each section 42, 43 includes a framework for supporting a cover of flexible screen material thereon, said framework being collapsible. The framework may be formed from metal rods or wires or even plastic tubing. The screen cover may consist of conventional metal screen, or may be formed from silk or nylon or any other suitable fabric.

Considering now the screen section 42, the framework thereof is comprised of a plurality of substantially U-shaped wires or rods 45, 46, 47, 48 and 49, each of which is bent to conform substantially to the configuration of continuous peripheral edge of the side edges 33 through 37 of plate 27. It will be noted that rods 45 through 49 are formed progressively larger one than the other, wire 45 being the smallest and wire 49 being the largest. The wire 45 is received in a curl 50 formed along one edge of a relatively wide flat strip 51 of metal, said strip 51 being bent in the same configuration as the wire 45 or substantially U-shaped. Likewise, the wire 49 is received in the curl 52 formed along one edge of the metallic strip 53, said strip 53 being bent into the same configuration as the wire 49. The metal strips 51 and 53 are purposefully formed relatively wide for the reasons more fully explained hereinafter.

The wires 45 to 49 are congruent. It is intended that these wires provide a foldable framework for supporting the screen cover thereon. To accomplish this, the ends of each wire are formed to provide trunnions thereat on which the wires may be pivoted. Thus, each end of wire 45 is bent at right angles at 55 and again at 56 to provide a trunnion 57 on each extremity of said wire. The wire 45 is positioned between the flanges 23 over plate 21 with each trunnion 57 received in an opening 24 in a flange 23, said opening being aligned one opposite the other. Likewise, wire 46 is bent in the manner of wire 45 to provide a trunnion 58 on each end thereof, likewise with wire 47 having trunnions 59, 59, wire 48 having trunnions 60, 60, wire 49 having trunnions 61, 61. The wires 46, 47, 48 and 49 are also positioned between the flanges 23 with the respective trunnions 58, 59, 60, 61 journaled in suitably aligned openings 24 so that wires 45 through 49 are progressively arranged one adjacent the other. It will be noted that the wires 45 through 49 are positioned progressively so that the wire 45 is supported in the openings 24 of flanges 23 nearest the plate 21 while the wire 49 is supported in such openings 24 farthest from the plate 21. The portions of the respective trunnions 57 through 61 on the ends of said wires exterior of the flanges 23 are then peaned over as 62 to prevent same from being removed or coming out. It is contemplated that such ends could also be threaded and a suitable nut provided for engagement on said threaded end so that the wires could not be removed from the flanges 23.

The above description in connection with the screen section 42 is intended also to describe the screen section 43. As shown in Figs. 7 and 8, screen section 43 also has the wires which have been designated 45 through 49 and their construction is identical to that of the wires described in connection with screen section 42. Each flange 23 has been shown to have ten such openings 24, there being five such openings on each side of the center of the flange. For purposes of description, one half of the flange 23 in Fig. 8 has been designated A and the other half B. The wires of screen section 42 will be supported progressively in the openings of portion A and the wires of section 43 in portion B. It will be understood therefore that the number of openings 24 provided in a flange 23 will correspond to the total number of wires utilized in frameworks of sections 42 and 43.

The framework formed by the wires 45-49 of each section 42 and 43 supports a cover 65 of screen material thereon. Each covering 65 is constructed in the same manner, however the particular manner in which each cover 65 is formed is not a limiting factor. As shown in the drawings, same may be formed of a plurality of suitably shaped panels sewn or secured together to form a unitary cover member 65 adapted to be superimposed on the framework formed by the wires 45-49 of each section 42, 43. It is contemplated that a cover member 65 may also be a single sheet of screen material cut to proper shape for being supported on a said framework. Likewise, such a cover 65 may be secured on a framework in any well-known manner, so long as it is adequately held thereon. As shown in Fig. 8, each cover 65 is secured on the wires 45-49 of a section 42 or 43 inside of the strips 51 and 53 respectively. It is believed unnecessary more particularly to describe any manner of forming a cover member 65 since any suitable method would suffice and same are well known in the art. Also, it is desired not to complicate the description and drawings with undue references to well known practices and which form no limiting factors in a complete understanding of the invention.

The operation of the device 20 as hereinabove described is simple and efficient. The screen sections 42 and 43 are pivotally mounted on the flanges 23 of plate 21, adjacent the plate members 27 and 28 with section 42 and 43 positioned therebetween. Referring to Figs. 1, 6 and 9, the device 20 is shown assembled to constitute same a carrying case, the food designated generally 67 being shown stored therein. This condition of assembly has been formed by pivoting each of plates 27 and 28 upwardly one toward the other so that each said plate is substantially perpendicular to the plate 21. In this condition, the screen sections 42 and 43 will be respectively folded between the plates 27 and 28, the wires 45-49 of each said screen section being bunched together and folding its associated cover 65. This condition is shown in Fig. 9, with the cover 65 being formed in loosely hanging folds 68 inside the device between plates 27, 28.

When the plates 27 and 28 are thus positioned perpendicular to the plate 21, the metal strip 53 of each section 42 and 43 will be engaged along adjacent edges thereof, the line of engagement being shown at 69 in Fig. 1. One of said strips 53 is bent downward as at 69' whereby the other will overlap the same so as to enable the device 20 to be completely closed. This is shown in Fig. 9. Likewise, the metal strip 51 of each section 42 and 43 will engage its companion strip 53 of that screen section, the line of engagement for strips 51 and 52 of screen section 42 being shown at 70 and the line of engagement for strips 51 and 53 of screen section 53 being shown at 71. Since the strips 51 and 53 extend entirely around the device 20 from one flange 23 to an opposite flange 23, there is formed an entirely enclosed casing when the side plates 27 and 28 are pivoted upwardly.

Referring to Figs. 1 and 2, in order to prevent the plates 27 and 28 from separating after being thus pivoted, I provide a latch member 72 having a loop 73 on one end thereof in which one portion 40 is engaged, the opposite end of member 72 having a hook portion 74 which is adapted to engage the other handle portion 40. The latch 72 is shown holding the portions 40, 40 against separation in Fig. 1. Likewise, I provide a latch member 75 which automatically locks the screen sections 42 and 43 against separation when they are folded to form the device 20 into a carrying case. One end of said latch 75 is secured as by the rivet 76 on one strip 53. The opposite end of said latch member 75 may be bent to form a hook portion (not shown) to engage the opposite strip 53 or as shown in Fig. 2, said opposite strip 53 may have a pin 77 suitable for engaging in an opening in member 75. The end 78 of said latch member may be bent to provide convenient means for lifting the latch member 75 from the pin 77. The exact construction is not of special importance, it being deemed advisable to supply some sort of latch means for preventing the inadvertent movement of the sections 41 and 42.

We now consider the operation of the device to provide its second condition of assembly. Presume that the device 20 is constituted a carrying case as in Fig. 1 and it is desired to open the same and form the same into a screen covered table surface as shown in Fig. 2. The latch 72 is disengaged and the plate members 27 and 28 are respectively pivoted outwardly and downwardly by means of handles 40 until each plate lies in the same plane as the plate 21, namely, horizontal. The hinged connection of plate 21 with each plate 27 and 28 prevents said plates from being swung down below substantial horizontal plane. Each screen section 42 and 43 will then unfold, with the metal strip 51 of screen section 42 being received inside of the rolled edge 38 of plate 27 and the metal strip 51 of section 43 being received inside of the rolled edge 38 of plate 28. This is shown in Fig. 2. The latch 75 prevents the collapse of the screen sections by holding the strips 53 of each screen section one against the other, also as shown in Fig. 2. There is thus formed a relatively large table surface by the plates 21, 27 and 28 which is completely enclosed by the screen sections 42 and 43.

Attention is now invited to Figs. 3, 4 and 5. It is desired to gain access to the device 20 in its condition of assembly as shown in Fig. 2. This may be accomplished either by collapsing one screen section or both, whichever is desired. As shown in Fig. 3, only one screen section has been collapsed, the other remaining in its unfolded condition. In Fig. 4, the collapsed screen section is shown being unfolded upwardly from the plate 27 to enclose the same. In Fig. 5, both of the screen sections 42 and 43 have been shown collapsed by folding each section on its respective plate member 27 and 28.

At this point, it is desired to emphasize that by reason of the unique structure of the framework supporting the screen cover 65 of each screen section 42 and 43, each of said sections is arranged to be collapsed in such a manner permitting unhampered access to the food 67. Attention is invited to Fig. 14, wherein the associated screen cover 65 has been removed so as to show the manner in which the wires 45 through 49 are nested one in the other on plate 27 when a screen section is collapsed. By way of example, the plate member 27 is shown; also, wires 45 through 49, and metal strips 51 and 53. As stated above, each of the wire members 45 through 49 is made progressively larger, with wire 45 being the smallest and wire loop 49 being the largest. Because of the relative size of said wires and their progressive positioning in the holes 24 of flange 23, when a screen section is collapsed to the position as shown in Fig. 3, the wires 45 through 49 will nest one in the other and provide a compact flat collapsing of the associated screen section and a relatively large opening through which the food 67 may be obtained.

Although the screen sections 42, 43 have been shown, and described as being mounted on the plate 21, it is contemplated that the screen sections may be so constructed as to dispense with the plate 21 and plates 27, 28. In this case, the framework of each screen section 42 and 43 would be pivotally mounted between a pair of plates similar to flanges 23, 23, however the said plates would not be supported on a base plate such as 21. The screen sections 42, 43 could be folded and unfolded in the manner described in connection with device 20. To cover some articles of food on a table, for instance, the screen sections could be unfolded and laid on the table over the articles of food. This embodiment has not been shown because it is believed to be clearly understandable how the screen sections could be used independently of a base plate 21.

Attention is now invited to Figs. 7, 14 and 19. Although the plates 27 and 28 are prevented by their hinged connection with the plate 21 from being pivoted beyond horizontal alignment with the plate 21, it is contemplated that inadvertent movement of the device 20 may cause the plates 27 and 28 to be pivoted upwardly. To prevent this inadvertent shifting in position of the plates 27 and 28, I provide an elongate, flat strip 80 of metal or the like pivotally secured on the plate 21 as at 81. As shown in Fig. 19, in locking position the strip 80 has a portion 82 which overlies the plate 27 and a portion 83 which overlies the plate 28 thereby preventing said plates from being pivoted upwardly after they have been aligned in the plane of plate 21. When it is desired to move said plates 27, 28, the strip 80 may be rotated until same overlies the plate 21 completely, thereby removing the portions 82 and 83 respectively from the plate members 27 and 28.

Referring to Fig. 10, there is provided on the inside surface of plate 27 an L-shaped lug 85 secured on said plate by means of a rivet 86, engaging with one leg of said lug. The lug 85 is spaced from the curled edge 38 a distance sufficient to permit the edge 38 on a strip 51 of screen section 42 to ride down the sloped surface 87 of flange 38 and be locked between lug 85 and flange 38 when the screen section 41 is unfolded to overlie plate 27. Although same has not been specifically shown, a similar lug 85 is provided on the second plate member 28 in a like position for locking the screen section 43 when unfolded on its associated plate member 28. As shown in Fig. 10, the screen section 42 may be easily disengaged from the lug 85 and edge 38 on plate 27, merely by pulling outwardly thereof on section 42.

As heretofore described, the device 20 obviously may be rested on a table or other supporting surface when it is desired to unfold the same to its condition of assembly shown in Fig. 2. It is contemplated however, that means may be provided for supporting the device on the ground spaced thereabove. In this connection attention is invited to Figs. 17 and 18 where a bottom perspective view of the device 20 is shown provided with such means comprising leg members. In Fig. 17, there is provided on each plate 27, 28, a pair of socket members 90, 91 into which is adapted to be screwed a threaded end of rod 92. Four such rods 92 have been shown advantageously positioned to support the device above ground said leg members being detachable from the device. In Fig. 18, another form of leg members is shown, herein comprising a plurality of rods 93, a pair of each being pivotally secured to the underside of a respective plate 27 and 28 as at 94. A folding linkage 95 is secured between each leg 93 at the plate 27 or 28 to which said leg 93 is secured permitting the leg to be folded against the underside of a said plate member when so desired.

It was mentioned hereinabove that our invention is capable also of being constructed so as to provide a fully insulated enclosure in either condition of assembly. In this regard, such an embodiment has been shown in Figs. 15 and 16 and designated generally 100. Instead of the flat plate members 21, 27 and 28 comprising the base portion of the device 20, I provide three hollow casings 101, 102 and 103. Each of said casings may be filled with suitable insulating material such as shown at 104. The casing 101 has flanges 23 formed one on each end thereof as described in connection with plate 21 for supporting therebetween complementary screen sections such as 41 or 42. However, instead of using a mesh like material such as covering 65 some material such as canvas or the like would be employed to insure complete insulation of the food stored in the device 100. The casings 101 and 103 are respectively hinged as at 105 to said casing 102 and may be pivoted upwardly to form the carrying case, such being the case in Fig. 16, or pivoted downwardly to lie in the plane of case 102, such being the case in Fig. 15. A handle such as 106 is provided on casing 103, there being a similar handle on the casing 101, said handle being pivotally engaged in the cylindrical flange 107 on casing 103.

Instead of the flat metal strip 51 on each screen section 41, 42 as described in connection with the device 20, we use an elongate casing 108 containing insulating material 109. This casing 108 extends along the wire 39 engaged by the continuous flange 110. When the device 100 is folded up to constitute same a carrying case similar to the condition shown in Fig. 1 for device 20, each casing 108 on the respective screen portions will be matingly engaged in the portion 111 on each casing 108 and the entire device 100 will be formed into a fully insulated enclosure. Thus, food stored therein can be retained in the device 100 for long periods of time without substantial change in the temperature thereof. The extension 108 on casing 103 (there being one also on casing 101) rides in and out of the cut-out portions 109, and closes same off when pivoted to a position shown in Fig. 16.

It is believed that the invention has been described with sufficient particularity enabling same to be understood and practiced commensurate with the requirements of the patent laws. It is intended not to be limited to the particular constructional features described except as set forth in the appended claims.

We claim:

1. A food screen device of the character described comprising a base portion and covering means for the base, said base portion including at least a pair of pivotal members and the covering means comprising a pair of complemental, foldable screen sections, said members being movable to one position folding the screen sections therebetween to constitute the device a carrying case for articles of food, and being movable to a second position providing a relatively large table surface for said articles, said screen sections adapted to be folded to form an enclosure over said surface when said pivotal members are in said second position, said screen sections being pivotally mounted on said base for movement independently of said pivotal members.

2. A food screen device of the character described comprising a base portion and covering means for the base, said base portion including at least a pair of pivotal members and the covering means comprising a pair of complemental, foldable screen sections, said members being movable to one position folding the screen sections therebetween to constitute the device a carrying case for articles of food, and being movable to a second position providing a relatively large table surface for said articles, said screen sections adapted to be folded to form an enclosure over said surface when said pivotal members are in said second position, said base portion including a fixed plate member having said pivotal members hingedly connected thereto on opposite sides thereof, said fixed plate having means for pivotally mounting said screen sections thereon.

3. A food screen device of the character described comprising a base portion and covering means for the base, said base portion including at least a pair of pivotal members and the covering means comprising a pair of complemental, foldable screen sections, said members being movable to one position folding the screen sections therebetween to constitute the device a carrying case for articles of food, and being movable to a second position providing a relatively large table surface for said articles, said screen sections adapted to be folded to form an enclosure over said surface when said plate members are in said second position, each screen section including a collapsible framework and a flexible cover secured on a said framework, each framework being pivotally mounted on said base portion and adapted to be pivoted one relative to the other when said pivotal members are in said second position.

4. A food screen device of the character described comprising a base portion and covering means for the base, said base portion including at least a pair of pivotal members and the covering means comprising a pair of complemental, foldable screen sections, said members being movable to one position folding the screen sections therebetween to constitute the device a carrying case for articles of food, and being movable to a second position providing a relatively large table surface for said articles, said screen sections adapted to be folded to form an enclosure over said surface when said plate members are in said second position, said base portion including a fixed plate member having said pivotal members hingedly connected thereto on opposite sides thereof, said fixed plate having means for pivotally mounting said screen sections thereon, said means comprising a pair of upstanding flanges spaced apart on said fixed plate member, said screen sections being pivotally mounted on said flanges.

5. A food screen device of the character described comprising a base portion and covering means for the base, said base portion including at least a pair of pivotal members and the covering means comprising a pair of complemental, foldable screen sections, said members being movable to one position folding the screen sections therebetween to constitute the device a carrying case for articles of food, and being movable to a second position providing a relatively large table surface for said articles, said screen sections adapted to be folded to form an enclosure over said surface when said plate members are in said second position, said base portion including a fixed plate member having said pivotal members hingedly connected thereto on opposite sides thereof, said fixed plate having means for pivotally mounting said screen sections thereon, said means comprising a pair of upstanding flanges spaced apart on said fixed plate member, each screen section including a collapsible framework and a cover supported on a said framework, each framework being journalled at respective ends thereof in a said flange.

6. A food screen device of the character described comprising a base portion and covering means for the base, said base portion including at least a pair of pivotal members and the covering means comprising a pair of complemental, foldable screen sections mounted on said base, said members being movable to one position folding the screen sections therebetween to constitute the device a carrying case for articles of food, and being movable to a second position providing a relatively large table surface for said articles, said screen sections adapted to be folded to form an enclosure over said surface when said plate members are in said second position, said base portion being comprised of insulating casings, said casings cooperating to constitute said device a fully insulated carrying case when said pivotal members are moved to said one position.

7. A food screen device of the character described comprising a base portion and covering means for the base, said base portion including at least a pair of pivotal members and the covering means comprising a pair of complemental, foldable screen sections mounted on said base, said members being movable to one position folding the screen sections therebetween to constitute the device a carrying case for articles of food, and being movable to a second position providing a relatively large table surface for said articles, said screen sections adapted to be folded to form an enclosure over said surface when said plate members are in said second position; said base portion including a rectangular plate member having said pivotal members hingedly connected each to a longer side edge of said plate member, said pivotal members each comprising a plate member having at least one side edge substantially equal in length to the length of a said longer side edge of the plate member, there being a continuous cylindrical flange along the other side edges of each pivotal member having a wire extending therethrough, said wire having a portion thereof exterior of said flange providing a handle for moving the pivotal member.

8. A food screen device of the character described comprising a base portion and covering means for the base, said base portion including at least a pair of pivotal members and the covering means comprising a pair of complemental, foldable screen sections, said members being movable to one position folding the screen sections therebetween to constitute the device a carrying case for articles of food, and being movable to a second position providing a relatively large table surface for said articles, said screen sections adapted to be folded to form an enclosure over said surface when said plate members are in said second position, said base portion including a fixed plate member having said pivotal members hingedly connected thereto on opposite sides thereof, said fixed plate having means for pivotally mounting said screen sections thereon, said means comprising a pair of arcuate, upstanding flanges aligned one opposite the other, each screen section including a framework comprising a plurality of substantially U-shaped rod members, each flange having a plurality of radially aligned openings therein, each opening in a said one flange being aligned with an opening in the other flange, said wire members of each framework being journalled at its respective ends in a pair of aligned openings.

9. A food screen device of the character described comprising a base portion and covering means for the base, said base portion including at least a pair of pivotal members and the covering means comprising a pair of complemental, foldable screen sections mounted on said base, said members being movable to one position folding the screen sections therebetween to constitute the device a carrying case for articles of food, and being movable to a second position providing a relatively large table surface for said articles, said screen sections adapted to be folded to form an enclosure over said surface when said plate members are in said second position, said base portion including a rectangular plate member having said pivotal members hingedly connected each to a longer side edge of said plate member, said pivotal members each comprising a plate member having at least one side edge substantially equal in length to the length of a said longer side edge of the plate member, there being a continuous cylindrical flange along the other side edges of each pivotal member having a wire extending therethrough, said wire having a portion thereof exterior of said flange providing a handle for moving the pivotal member and a latch member on one of said wire portions adapted to engage the other wire portion when said pivotal members are moved to said one position.

10. A food screen device of the character described comprising a base portion and covering means for the base, said base portion including at least a pair of pivotal members and the covering means comprising a pair of complemental, foldable screen sections, said members being movable to one position folding the screen sections therebetween to constitute the device a carrying case for articles of food, and being movable to a second position providing a relatively large table surface for said articles, said screen sections adapted to be folded to form an enclosure over said surface when said plate members are in said second position, said base portion including a fixed plate member having said pivotal members hingedly connected thereto on opposite sides thereof, said fixed plate having means for pivotally mounting said screen sections thereon, said means comprising a pair of arcuate, upstanding flanges aligned one opposite the other, each screen section including a framework comprising a plurality of substantially U-shaped rod members, each flange having a plurality of radially aligned openings therein, each opening in a said one flange being aligned with an opening in the other flange, said wire members of each framework being journalled at its respective ends in a pair of aligned openings, the wire members of each framework being of progressively larger dimensions and mounted on said flanges whereby when a screen section is unfolded, said wires will nest on a said pivotal member one inside the other.

References Cited in the file of this patent

UNITED STATES PATENTS

| Number | Name | Date |
| --- | --- | --- |
| 704,237 | Childress | July 8, 1902 |
| 796,864 | Ramsay | Aug. 8, 1905 |
| 1,028,271 | Phillips | June 4, 1912 |
| 2,659,481 | Jones | Nov. 17, 1953 |